Patented Mar. 26, 1935

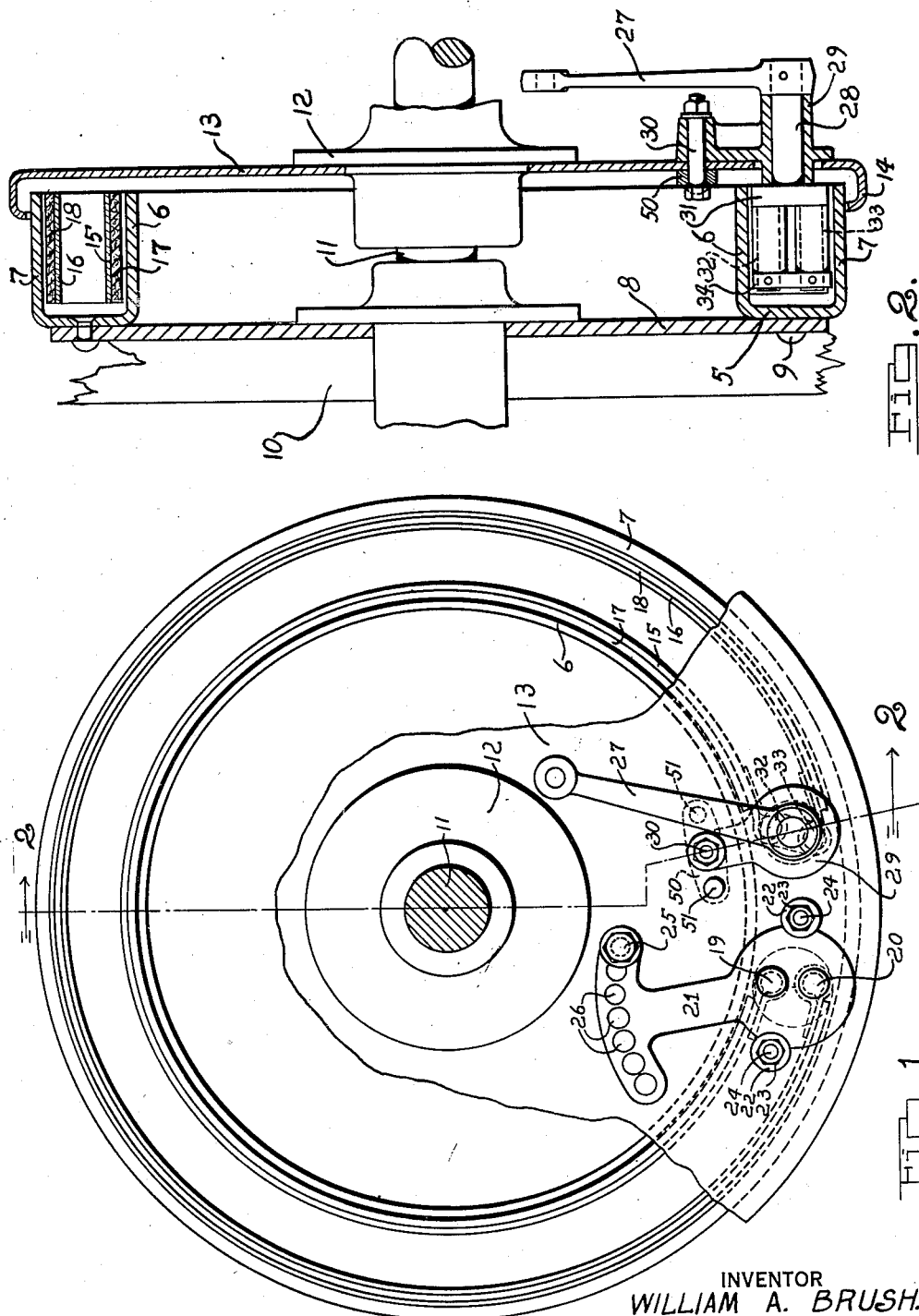

1,995,833

UNITED STATES PATENT OFFICE 1,995,833

BRAKE

William A. Brush, Detroit, Mich.

Application October 5, 1929, Serial No. 397,488

22 Claims. (Cl. 188—74)

This invention relates to brakes and is particularly applicable to brakes for wheels or the like. It is a common expedient, in the construction of brakes, to provide a brake drum which has either exterior brake bands or interior brake bands or shoes which are applied to the brake drum for the purpose of bringing about the braking action. It is a well known fact that metallic brake drums expand when they are heated and that continuous application of the brakes causes a heating of the drum with consequent expansion thereof. When an exterior brake band is utilized, this expansion results in an unintentional application of the brakes. In the case of internal bands or shoes, expansion of the brake drum tends to move it away from the bands or shoes, thus lessening the braking possibilities.

It is the primary object of my invention to provide a brake construction wherein both internal and external brake applying means are utilized and the brake applying means are so arranged that when the drum heats and expands the result upon the two brake applying means will be directly opposite. An important object is to provide in a structure of this character means whereby the position of the brake applying means, or portions thereof, may be shifted as expansion or contraction of the drum occurs so as to equally apply braking pressure through both the internal and external brake applying means.

Another object may be stated to be that of providing a floating or pivoted support for the free ends of the internal and external brake applying means.

Another object of my invention is to provide such a construction wherein the brake drum is provided with spaced braking surfaces for the brake applying means, thereby permitting more efficient cooling of the same in operation.

Another object is to provide means whereby both internal and external brake applying means may be housed from the elements, braking and lubricating fluid or other foreign matter.

Another object is to construct such a brake in a simple and economical manner whereby the desired results may be obtained without excessive cost.

With the above and other objects in view, my invention consists in the arrangement, combination and construction of the various parts of my improved device as described in the specification, claimed in my claims and shown in the accompanying drawing, in which:

Fig. 1 is a side elevation, with certain parts broken away, showing a brake drum with my improved braking mechanism.

Fig. 2 is a sectional view taken in line 2—2 of Fig. 1.

I have shown a brake drum comprising a member 5, which is generally U shaped, in cross section, thereby providing an inner braking surface 6 and an outer braking surface 7. The member 5 may be secured to a plate 8, as by rivets 9, and the plate 8 may be secured to a wheel 10, which is adapted to operate on the axle 11.

Non-rotatably carried on the axle 11 is a member 12, which supports a plate 13. The plate 13 extends over the open end of the member 5 and is bent at its edges, as at 14, so as to substantially house the interior of the member 5 against the elements.

Mounted within the member 5 are brake bands 15 and 16, carrying brake linings 17 and 18, respectively. The lining 17 is adapted to contact with the inner ring 6 of the brake drum and the lining 18 is adapted to contact with the outer ring 7 thereof. The brake bands are anchored, as at 19 and 20, to a member 21, which is held in place at one end by washers 22 and nuts 23 provided on bolts 24. The other end of the member 21 may be adjustably secured by a bolt 25 extending through either of the several openings 26.

For the application of the brake bands and their linings to the brake drum, I provide an operating lever 27, which is connected to the shaft 28 rotatably mounted in the member 29. The member 29 is pivotally mounted on bolt 30 which is carried by plates 13 and 50, the latter being secured on the former by rivets 51. The shaft 28 is provided with an enlargement 31, from which pins 32 and 33 extend. The band 15 is secured to the pin 32 and the band 16 is secured to the pin 33. An end member 34 is secured to the pins 32 and 33 for preventing displacement of the brake bands endwise of the pins.

It will be readily seen that when the lever 27 is rocked, the shaft 28 will be rotated and that rotation of the shaft in a clockwise direction, as seen in Fig. 1, will result in the inner band 15 being moved away from the inner braking surface 6 and the outer band 16 likewise being moved relative to the outer braking surface 7. In this movement the inner band will be expanded and outer band contracted. An anti-clockwise rotation of the shaft 28 causes a contraction of the band 15 and expansion of the band 16, with a consequent application of the brake linings to the inner and outer braking surfaces or drum portions.

It will be quite apparent that the pivoting of the member 29 will permit the bands 15 and 16 to be shifted relative to the rings 6 and 7, so as to substantially equalize the pressure applied to each ring. If, for instance, the lining 16 contacts with the ring 7 before the lining 17 contacts with ring 6, whether this be caused by contraction of the brake drum or difference in thickness of the linings, the member 29 will shift on its pivot 30 to bring the lining 17 into contact with the ring 6. The converse of this is, of course, true so that variations in adjustment and variations due to expansion or contraction of the brake drum will not cause a variation between the respective pressures applied by the two bands.

It will likewise be apparent that the ring 7, which is to cooperate with the internal band 16, serves to enclose the bands from the outside and the ring 6, which is to cooperate with the external band 15, serves to enclose the bands from the inside.

In the construction of brake illustrated and described it will be apparent that if the wheel is rotating counterclockwise as seen in Fig. 1, and the brake is applied, the frictional engagement between the outer band and outer drum tends to cause the band to move with the rotating drum and, since this cannot occur owing to the anchored end of the band, the band may be applied more forcefully. To the contrary, the frictional engagement between the inner band and the inner drum when the wheel is rotating counter-clockwise will tend to unwrap this band and reduce its braking effect. When the wheel is rotating clockwise, the frictional engagement between the inner band and the inner drum causes the inner drum to tend to carry the band with it in a wrapping relation and hence this band is applied more forcefully, while the frictional engagement between the outer band and outer drum when the wheel is rotating in this direction tends to reduce its braking effect. It thus will be appreciated that when the wheel is rotating in one direction there is an accumulating braking action relative to one band and when the wheel is rotating in the other direction there is accumulating braking action relative to the other band.

I desire it to be understood that various operating mechanisms may be utilized with my invention—that the brake may be operated either mechanically or hydraulically—and that the various details of construction herein shown and described are merely illustrative of one form of my device.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. A brake drum having a pair of spaced rings, one smaller than the other, means for frictionally engaging the exterior of the smaller ring and the interior of the larger one with substantial equality and for maintaining the frictional engagement substantially equal.

2. A brake drum having a pair of spaced rings, one smaller than the other, means for frictionally engaging the exterior of the smaller ring and the interior of the larger one with substantial equality, and common means for simultaneously actuating said first means and for maintaining the frictional engagement substantially equal.

3. A brake drum having a pair of spaced rings, one smaller than the other, means for frictionally engaging the exterior of the smaller ring and the interior of the larger one with substantial equality, common means for simultaneously actuating said first means, and for maintaining the frictional engagement substantially equal and means for enclosing said first means between said rings to shield them from the foreign matter.

4. A brake drum having a pair of spaced rings, one within the other, a plurality of devices adapted to frictionally engage said rings with substantial equality, at least one device engaging the exterior of the smaller ring and at least one device engaging the interior of the larger ring and means for maintaining the frictional engagement substantially equal.

5. A brake drum having a pair of spaced rings, one within the other, a plurality of devices adapted to frictionally engage said rings with substantial equality, at least one device engaging the exterior of the smaller ring and at least one device engaging the interior of the larger ring, and common means for simultaneously operating said devices and means for maintaining the frictional engagement substantially equal.

6. In a brake mechanism, two concentric braking members, friction means for providing a frictional engagement with the outer surface of the inner member, and frictional engagement with the inner surface of the outer member; said friction means including two friction elements; actuating and adjusting mechanism for said friction elements, and self-adjusting means in said actuating mechanism permitting simultaneous expansion of each of said members to neutralize the effect of the expansion of the other.

7. In a brake mechanism, two concentric braking members, friction means for providing a frictional engagement with the outer surface of the inner member and frictional engagement with the inner surface of the outer member; said friction means including two friction elements; actuating and adjusting mechanism for said friction elements, and means in said actuating mechanism tending to increase friction tension on both friction elements as the inner member expands, and tending to decrease friction tension on both friction elements as the outer member expands.

8. In a brake mechanism, two concentric braking surfaces, friction means for providing a frictional engagement with the outer surface of the inner member and frictional engagement with the inner surface of the outer member; said friction means including two friction elements; actuating means at one end of each of said elements and adjusting means operatively connected to the opposite end of each of said elements.

9. In a brake mechanism, two concentric braking members, friction means for providing a frictional engagement with the outer surface of the inner member and frictional engagement with the inner surface of the outer member; said friction means including two friction elements, actuating means at one end of each of said elements, adjusting means at the opposite end of each of said elements, said actuating means having substantial tangential freedom of position and said adjusting means forming an anchor for resisting the braking effect of said friction means.

10. In a brake mechanism, two concentric braking members, friction means for providing a frictional engagement with the outer surface of the inner member, and frictional engagement with the inner surface of the outer member; said friction means including two single acting brake bands; means for causing frictional engagement between the two bands and the two members respectively, whereby one of said bands produces a cumulative braking effect in one direction of rotation of the members, and the other of said bands produces a cumulative braking effect in the opposite direction of rotation of said members, means for anchoring an end of each of said bands to resist the friction effect, and adjusting means associated with the anchoring means adapted to adjust said bands to compensate for wear.

11. In a brake mechanism, two concentric braking members, friction means for providing a frictional engagement with the outer surface of the inner member and frictional engagement with the inner surface of the outer member; said friction means including friction elements for co-acting with each of said members, separate applying and adjusting mechanism for said elements, said adjusting mechanism adapted to anchor said friction elements to resist the braking effect.

12. In a brake mechanism, two concentric braking members, friction means for providing frictional engagement with the outer surface of the inner member and frictional engagement with the inner surface of the outer member; said frictional means including two friction elements for frictional engagement with each of said members respectively; one of said members and its corresponding friction engaging element adapted to produce a cumulative braking effect when the members rotate in one direction and the other of said members and its friction engaging element adapted to produce a cumulative braking effect when the members rotate in the opposite direction.

13. A brake mechanism including two concentric braking members and two concentric friction elements, one of said friction elements engaging the outer member and one of said friction elements engaging the inner member; each of said friction elements having greater frictional capacity in one direction of rotation of the members than in the other, said friction variation being oppositely disposed so that one member and its corresponding friction element produces a major braking effect in one direction of rotation and the other member and its friction engaging element produces its major frictional effect when the members rotate in the opposite direction.

14. In a brake mechanism, relatively rotatable members, one of which has two concentric braking surfaces, friction bands for frictionally engaging the braking surfaces, means for anchoring one end of each band on the other member, and common means for actuating and equalizing the operation of the bands with respect to the braking surfaces, said means including an element movably secured to the second mentioned member.

15. In a brake mechanism, relatively rotatable members, one of which has two concentric braking surfaces, friction bands for frictionally engaging the braking surfaces, means for anchoring one end of each band on the other member, and means for actuating and equalizing the operation of the bands with respect to the braking surfaces, said means including an element pivotally mounted on the second mentioned member.

16. In a brake mechanism, relatively rotatable members, one of which has two concentric braking surfaces, friction bands for frictionally engaging the braking surfaces, means for anchoring one end of each band on the other member and means for actuating and equalizing the operation of the bands, said last mentioned means including an element connected to both bands and means pivotally mounted on the second mentioned member and connected operatively to the actuating element.

17. In a brake mechanism, two concentric braking members, friction means for providing frictional engagement with the outer surface of the inner member, and frictional engagement with the inner surface of the outer member, said friction means including two single acting brake bands, means for causing frictional engagement between the two bands and the two members respectively, and causing one of said bands to produce a cumulative braking effect in one direction of rotation of the members and the other of said bands to produce a cumulative braking effect in the opposite direction of rotation of said members.

18. In a brake mechanism, two concentric braking members, friction means for providing frictional engagement with the outer surface of the inner member and friction engagement with the inner surface of the outer member, said friction means including two single acting brake bands, means for causing frictional engagement between the two bands and the two members respectively, and causing one of said bands to produce a cumulative braking effect in one direction of rotation of the members and the other of said bands to produce a cumulative braking effect in the opposite direction of rotation of said members, and means for anchoring one end of each of said bands to resist the friction braking effect.

19. In a brake mechanism, relative rotatable members, one of said members having a pair of concentric spaced braking surfaces, friction band elements extending along and between the surfaces and adapted to engage them respectively, means for anchoring the ends of the band elements on the other member, and common means connected to the other ends of the band elements for expanding one band and contracting the other into engagement with the braking surfaces respectively, said means last mentioned having substantial tangential freedom of position.

20. In a brake mechanism, relatively rotatable members, one of which has a pair of concentric braking surfaces, friction band elements adapted to contact with such surfaces respectively, common adjusting means at one end of the bands for compensating for wear, and actuating means for causing the bands to engage the friction surfaces respectively, said adjusting means being operable independently of the actuating means.

21. In a braking mechanism, relative rotatable members, one of which has two concentric and radially separated braking surfaces, friction bands between said surfaces for engaging them respectively, means anchoring adjacent ends of the bands, and means operatively connected to opposite ends of the bands for expanding one and contracting the other into engagement with the braking surfaces respectively, said last mentioned means including an actuating device floatable circumferentially between the braking surfaces and movable in opposite directions by the respective engagement of such bands with the braking surfaces.

22. In a brake mechanism, two concentric braking members, friction bands adapted to engage the members respectively, means adjustably anchoring one end of each band for simultaneous adjustment and in opposite directions, and means for moving the opposite ends of the bands to apply the brakes.

WILLIAM A. BRUSH.